Aug. 5, 1930.  C. V. WITT  1,772,378
METHOD OF PROTECTING PIPE SEAMS AND JOINTS
Filed Oct. 5, 1929
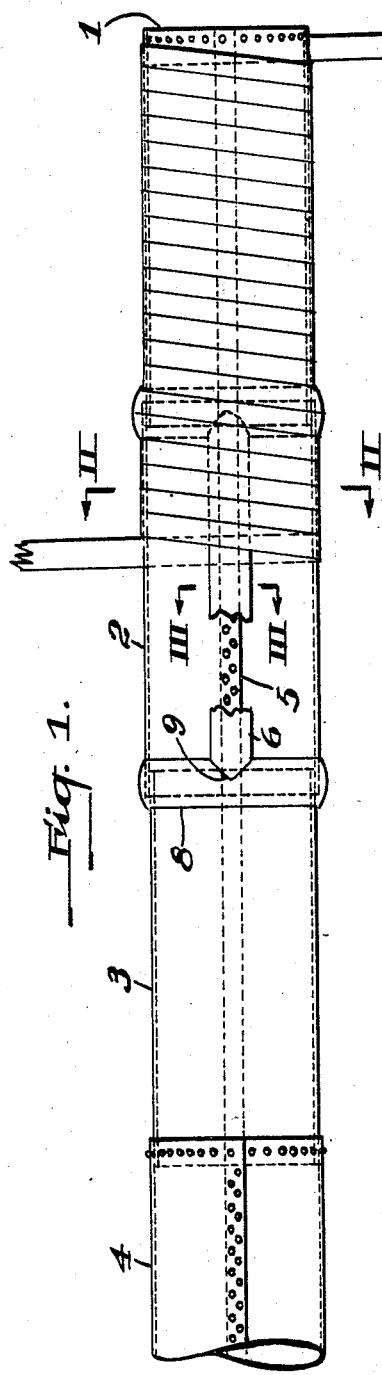
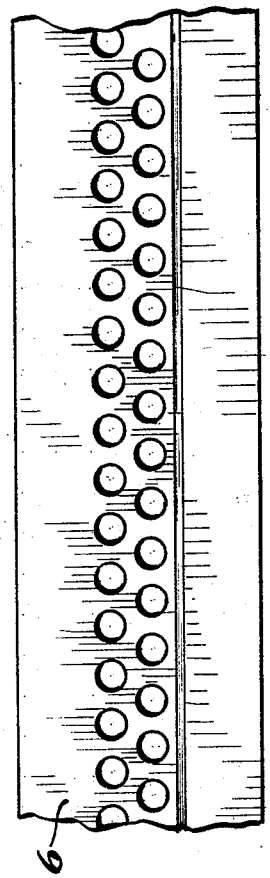
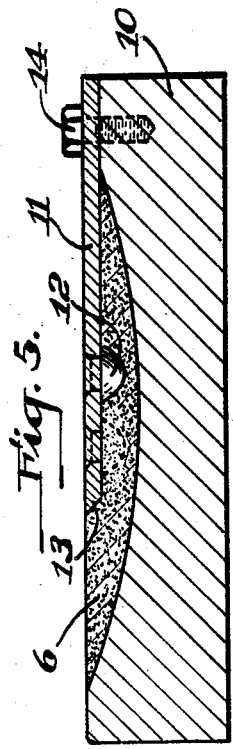
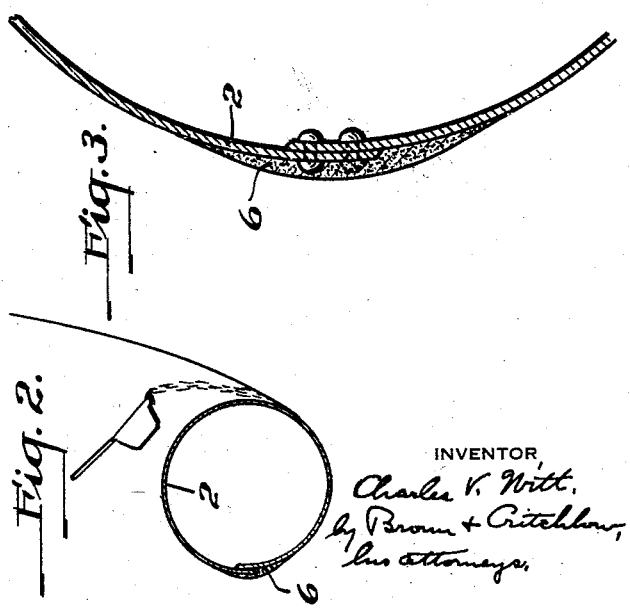
WITNESS
AB Wallace
INVENTOR,
Charles V. Witt.
by Brown + Critchlow,
his attorneys.

Patented Aug. 5, 1930

1,772,378

UNITED STATES PATENT OFFICE

CHARLES V. WITT, OF GREENSBURG, PENNSYLVANIA

METHOD OF PROTECTING PIPE SEAMS AND JOINTS

Application filed October 5, 1929. Serial No. 397,573.

This invention relates to protection of the exterior surface of pipes against corrosion, and has particularly to do with the protection of pipes which are so fabricated and connected to each other that they have external protruding seams, as for example lock-bar and riveted seam pipes.

To protect pipes against corrosion, it is common practice to dip them in a large tank of properly heated corrosion-resisting material, such as refined asphaltum, the pipe usually being preheated to about the temperature of the material before being dipped in it. After removing the pipe from the tank the excess coating material is permitted to drain from it into receptacles which necessarily expose the material for such periods of time that it becomes somewhat contaminated with dust and other foreign matter, and also loses some of its volatile constituents, on account of which the drip material is ordinarily not returned to the dipping tank. The dip coating thus applied is rather thin, and accordingly insufficient to adequately resist corrosion, particularly under highly corrosive conditions of service. To increase the corrosion resistance of such dipped pipe, the practice is to encase it in a helical overlapping wrapping of flexible strips of paper or cloth, such as felt, while pouring heated asphaltum or other corrosion-resisting material between the pipe and the wrapping as the pipe is rotated to apply the wrapping. There is thus provided a much heavier coating of corrosion-resisting material, which, until it solidifies, is held upon the pipe by the helical wrapping.

In thus applying an extra coating of corrosion resisting material to the pipe, it has not been possible to satisfactorily prevent the presence of voids between the wrapping and the pipe at the protruding seams of the latter. The riveted or lock-bar seams so protrude from the exterior cylindrical surfaces of the pipes that the protrusions raise the wrapping from the adjacent surface portions of the pipes, and the spaces between the thus raised wrapping and the pipe do not become filled with the coating material. Accordingly, both the longitudinal and girt seams are, from the standpoint of corrosion resistance, the weakest points of the pipe. Furthermore, in the handling of the pipe the wrapping frequently becomes punctured at the voids, permitting the ingress of water between the wrapping and the coating.

The object of this invention is to provide a method of adequately protecting against corrosion the seams protruding from the exterior of pipes which are otherwise protected against corrosion in the manner explained above.

In the practice of this invention, protruding seams are protected against corrosion by precasting strips of corrosion-resisting material in such forms that their interior faces conform to the protrusions of the seams, and so applying such strips to the seams that the recesses of the former encase the protrusions of the latter. The exterior surfaces of the strips are of convex form, so shaped that, in the case of longitudinal seams, they merge into the curvature of the pipes so that helically applied wrappings do not become spaced from the pipes, and, in the case of girt seams, either helical or annular strips of flexible material applied to the pipe and strips readily conform to them.

While various corrosion-resisting materials may be used for forming the strips, they are preferably cast from heated asphaltum, it being possible to use the partially contaminated material which drips from the dip-coated pipe because it is unnecessary to use material of the highest purity for casting the strips. Before applying the strips to longitudinal seams, a liquid coating of corrosion-resisting material, preferably heated asphaltum, is applied to the seams and to the adjacent surfaces of the strips for sealing the strips to the pipes. Also, before applying the strips to the seams, the former are sufficiently heated to permit them to be bent to the curvature of the pipe as they are applied to the seam.

The invention may be further explained with reference to the accompanying drawings, of which Fig. 1 is an elevation of a section of pipe having riveted longitudinal and girt seams, a portion of the pipe being shown as having a wrapping of flexible material helically applied to it; Fig. 2 a transverse sectional view taken on the line II—II, Fig. 1, diagrammatically illustrating the manner of applying the helical wrapping of the pipe; Fig. 3 a detail sectional view taken on the line III—III, Fig. 1, illustrating to enlarged scale a longitudinal riveted seam with a precast strip of corrosion-resisting material applied to it; Fig. 4 a face view of a portion of a precast strip; and Fig. 5 a sectional view of a suitable mold for casting the strips.

The section of pipe illustrated in Fig. 1 is formed from four plates 1, 2, 3 and 4, each of which is bent to cylindrical form with its overlapping edges joined together by a longitudinal riveted seam, such as illustrated at 5 in Figs. 1 and 2, the ends of adjacent portions telescoping with each other and connected by riveted girt seams. To each longitudinal seam there is applied a precast strip 6 which has been sufficiently heated to permit it to be readily bent to conform to the curved surface of the pipe. As shown in Fig. 3, the strip has its interior surface provided with recesses conforming to the exterior rivet heads of the seams and to the step between the overlapping edges of the plate. As also appears from Fig. 3, the exterior surface of strip 6 is formed to merge with the curvature of the pipe, or in other words is so curved that it merges tangentially with the curvature of the pipe so that when a wrapping is applied there are no voids between it and the pipe and strip. Likewise, suitable precast strips 8 are applied to the girt seams of the pipe, these strips having interior surfaces which conform to the protrusions at the girt seams, and having exterior surfaces which permit the wrapping to be applied without forming voids. At its end, each longitudinal strip 6 may be suitably tapered to extend into a notch cut in the side of a girt strip 8, as shown at 9, so that the two properly merge into each other.

Strips 6 may be cast in a mold, such as shown in Fig. 5, comprising a bottom 10 and a top plate 11, the lower surface of which plate is provided with rivet heads 12 for forming recesses in the strip located and spaced the same as the heads of rivets at the seam. The thickness of plate 11 is the same as that of the plate of which the pipe is formed so that the edge 13 of plate 11 forms a step in the strip conforming to the overlapping edge of the plate at its seam. The mold cavity thus formed is filled with a body of heated asphaltum, or other suitable corrosion-resisting material, to the level of the upper face of the plate 11. After the strip has set sufficiently for handling, it may be removed from the mold by first removing plate 11 which may be attached to mold bottom 10 by bolts 14. In Fig. 4 there is illustrated the recess provided for the face of strip 6 to be applied to the longitudinal seams of the pipe shown in Fig. 1, the strip being shown as being provided with staggered rivet head recesses and with a stepped offset. In a similar manner other strips for seams having different protrusions may be precast in suitably formed molds.

In applying the strips to a section of pipe in a fabricating plant, the strips are first heated sufficiently to permit them to conform to the curvature of the pipe, and then placed on the pipe with an interposed coating of sealing material. Thereafter the pipe is wrapped with a strip of flexible material, the pipe being rotated as the strip is helically applied to it. While the wrapping is applied, heated corrosion-resisting material is placed between the strip and the pipe, which may be done by pouring the material as diagrammatically illustrated in Fig. 2. The girt joints in the field may be protected by precast strips in substantially the same manner as explained, a layer of flexible material being annularly applied to the girt joint strips after they are applied to the pipe joints.

Although the invention has been illustrated and described primarily with reference to the protection of riveted seamed pipe, it will be understood that it is applicable to lock-bar and other forms of pipe which have protruding seams, it being only necessary to precast the protecting strips in such forms as to conform to the various shapes of protruding seams and to prevent the presence of voids between the wrapping and the coating.

I claim as my invention:

1. The method of protecting against corrosion a seam protruding from the exterior of a pipe, comprising precasting a strip of corrosion-resisting material with a face having recesses conforming to the protrusions of the same, and applying said strip to the pipe seam with the recess of the former encasing the protrusions of the latter.

2. The method of protecting against corrosion a seam protruding from the exterior of a pipe, comprising precasting a strip of corrosion-resisting material with a face having recesses conforming to the protrusions of the seam, applying said strip to the pipe seam with the recesses of the former encasing the protrusions of the latter, and encasing said strip and pipe in a wrapping of flexible material.

3. The method of protecting against corrosion a longitudinal seam projecting from the exterior of a pipe, comprising precasting a strip of corrosion-resisting material with its interior face having recesses conforming to the protrusions of the seam and with its exterior convex surface formed to merge into that of pipe to which the strip is applied, applying said strip to the pipe seam with the recesses of the former encasing the protrusions of the latter, and encasing the pipe and strip in a wrapping of flexible material helically applied to the pipe.

4. The method of protecting against corrosion a longitudinal seam projecting from the exterior of a pipe, comprising precasting a strip of corrosion-resisting material with its interior face having recesses conforming to the protrusions of the seam and with its exterior convex surface formed to merge into that of pipe to which the strip is applied, sealing said strip to the pipe seam by a fluid coating of corrosion-resisting material and with the recesses of the strip encasing the protrusions of the seam, and encasing the pipe and seam in a wrapping of flexible material helically applied to the pipe.

In testimony whereof, I sign my name.

CHARLES V. WITT.